United States Patent
Good et al.

(10) Patent No.: US 10,289,109 B2
(45) Date of Patent: May 14, 2019

(54) METHODS OF ERROR DETECTION IN FABRICATION PROCESSES

(71) Applicant: GLOBALFOUNDRIES Inc., Grand Cayman (KY)

(72) Inventors: Richard Good, Saratoga Springs, NY (US); Eugene Barash, Niskayuna, NY (US); James Broc Stirton, Galway, NY (US); Daniel Kost, Klipphausen (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 422 days.

(21) Appl. No.: 15/258,217

(22) Filed: Sep. 7, 2016

(65) Prior Publication Data

US 2017/0097638 A1 Apr. 6, 2017

Related U.S. Application Data

(60) Provisional application No. 62/235,889, filed on Oct. 1, 2015.

(51) Int. Cl.
| | |
|---|---|
| G05B 23/02 | (2006.01) |
| G05B 19/418 | (2006.01) |
| G06F 19/00 | (2018.01) |

(52) U.S. Cl.
CPC ...... *G05B 23/0291* (2013.01); *G05B 19/4184* (2013.01); *G05B 2219/32191* (2013.01);
(Continued)

(58) Field of Classification Search
None
See application file for complete search history.

(56) References Cited

U.S. PATENT DOCUMENTS

| | | |
|---|---|---|
| 6,303,395 B1 | 10/2001 | Nulman |
| 8,103,478 B2 | 1/2012 | Good et al. |

(Continued)

FOREIGN PATENT DOCUMENTS

| | | |
|---|---|---|
| TW | 200408919 A | 6/2004 |
| TW | 200947251 A | 11/2009 |
| TW | 201039070 A | 11/2010 |

OTHER PUBLICATIONS

S. Bersimis et al., "Multivariate Statistical Process Control Charts: An Overview", MPRA Paper No. 6399, posted Dec. 20, 2007.
(Continued)

*Primary Examiner* — Eric C Wai
(74) *Attorney, Agent, or Firm* — Thompson Hine LLP; Francois Pagette (57) ABSTRACT

Methods and computer program products for performing automatically determining when to shut down a fabrication tool, such as a semiconductor wafer fabrication tool, are provided herein. The methods include, for example, creating a measurement vector including process parameters of semiconductor wafers, creating a correlation matrix of correlations between measurements of parameters obtained of each wafer, creating autocorrelation matrixes including correlations between measurements of the parameter obtained for pairs of wafers; creating a combined matrix of correlation and autocorrelation matrixes, obtaining a $T^2$ value from the measurement vector and combined matrix, and stopping a semiconductor wafer fabrication tool if the $T^2$ value exceeds a critical value.

20 Claims, 7 Drawing Sheets

(52) U.S. Cl.
CPC .............. *G05B 2219/42001* (2013.01); *G05B 2219/45031* (2013.01); *G05B 2223/02* (2018.08); *Y02P 90/22* (2015.11)

(56) References Cited

U.S. PATENT DOCUMENTS

| | | | |
|---|---|---|---|
| 9,929,062 B2 | 3/2018 | Matsushita | |
| 2012/0150489 A1* | 6/2012 | Dhurandhar | G06F 17/18 |
| | | | 702/179 |
| 2014/0135968 A1* | 5/2014 | Lee | G05B 19/4184 |
| | | | 700/108 |
| 2016/0063157 A1* | 3/2016 | Huang | G06F 17/5036 |
| | | | 716/136 |

OTHER PUBLICATIONS

Taiwan Patent Office, Examination Report from the Intellectual Property Office for TW Application 105131175 dated Jul. 25, 2017, 13 pages.

\* cited by examiner

METHODS OF ERROR DETECTION IN FABRICATION PROCESSES

CROSS-REFERENCE TO RELATED APPLICATIONS

This application claims the benefit of U.S. Provisional Patent Application No. 62/235,889, filed on Oct. 1, 2015.

FIELD OF THE INVENTION

The present invention relates to error detection in fabrication processes, and more particularly, to Statistical Process Control methods for detecting semiconductor fabrication errors and automatically determining when to shut down a fabrication tool.

BACKGROUND OF THE INVENTION

Manufacturing of integrated circuits on semiconductor wafers may involve numerous stages of fabrication and processing, and may thus require several processes for detecting fabrication errors. When significant fabrication errors are found on a wafer or a batch of wafers, such that the wafers are defective and unusable, fabrication tools may need to be shut down and adjusted or fixed to prevent further fabrication of wafers with such significant errors. However, many techniques for detecting fabrication errors have a high "false alarm" rate, causing fabrication tools to be needlessly shut down and wasting valuable manufacturing and engineering time, as well as greatly reducing productivity and wafer yield.

SUMMARY OF THE INVENTION

Various shortcomings of the prior art are overcome, and additional advantages are provided through the provision, in one aspect, of a method for stopping semiconductor fabrication, including creating a measurement vector including a measurement of each of one or more parameters from each of one or more semiconductor wafers; for each of the one or more semiconductor wafers, creating a correlation matrix, wherein the correlation matrix includes correlations between measurements of parameters obtained of each said wafer; for each pair of the one or more semiconductors for which a measurement of a parameter has been obtained from each semiconductor wafer of the pair, creating an autocorrelation matrix, wherein the autocorrelation matrix includes correlations between measurements of the parameter obtained of each wafer of the pair; creating a combined matrix, wherein creating includes combining correlation and autocorrelation matrixes into a combined matrix; obtaining a $T^2$ value from the measurement vector and combined matrix; and stopping a semiconductor wafer fabrication tool if the $T^2$ value exceeds a critical value.

In some embodiments, the confidence value is greater than 95%, greater than 97.5%, or greater than 99%. In other embodiments, the measurement vector, the correlation matrix, the autocorrelation matrix, the combined matrix, the $T^2$ value, or any combination of two or more of the foregoing, is created, constructed, or obtained by a computer. In yet other embodiments, a computer stops the semiconductor wafer fabrication tool if a $T^2$ value is obtained that exceeds a critical value.

In another aspect, provided is method for stopping semiconductor fabrication, including creating a measurement vector including a measurement of each of one or more parameters from each of one or more semiconductor wafers; for each of the one or more semiconductor wafers, creating a correlation matrix, wherein the correlation matrix includes correlations between measurements of parameters obtained of each said wafer; for each pair of the one or more semiconductors for which a measurement of a parameter has been obtained from each semiconductor wafer of the pair, create an autocorrelation matrix, wherein the autocorrelation matrix includes correlations between measurements of the parameter obtained of each wafer of the pair; creating a combined matrix, wherein creating includes combining correlation and autocorrelation matrixes into a combined matrix; obtaining a $T^2$ value from the measurement vector and combined matrix; wherein the measurement vector, the correlation matrix, the autocorrelation matrix, the combined matrix, the $T^2$ value, or any combination of two or more of the foregoing, is created, constructed, or obtained by a computer; and stopping a semiconductor wafer fabrication tool if the $T^2$ value exceeds a chi-square distribution value includes a degrees of freedom value and a preselected confidence value and the degrees of freedom value is the number of measurements in the measurement vector and the preselected confidence value is greater than 95%.

In some embodiments, the preselected confidence interval is greater than 95%, greater than 97.5%, or greater that 99%. In other embodiments, a computer stops the semiconductor wafer fabrication tool if the $T^2$ value exceeds the critical value.

In yet a further aspect, provided is a method for stopping semiconductor fabrication, including creating a measurement vector including a measurement of each of one or more parameters from each of one or more semiconductor wafers; for each of the one or more semiconductor wafers, creating a correlation matrix, wherein the correlation matrix includes correlations between measurements of parameters obtained of each said wafer; for each pair of the one or more semiconductors for which a measurement of a parameter has been obtained from each semiconductor wafer of the pair, creating an autocorrelation matrix, wherein the autocorrelation matrix includes correlations between measurements of the parameter obtained of each wafer of the pair; creating a combined matrix, wherein creating includes combining correlation and autocorrelation matrixes into a combined matrix; obtaining a $T^2$ value from the measurement vector and combined matrix; wherein the measurement vector, the correlation matrix, the autocorrelation matrix, the combined matrix, the $T^2$ value, or any combination of two or more of the foregoing, is created, constructed, or obtained by a computer; and stopping a semiconductor wafer fabrication tool if the $T^2$ value exceeds a chi-square distribution value including a degrees of freedom value and a preselected confidence value and the degrees of freedom value is the number of measurements in the measurement vector and the preselected confidence value is greater than 95%, wherein a computer stops the semiconductor wafer fabrication tool.

In some embodiments, the preselected confidence interval is greater than 97.5% or greater than 99%. In other embodiments, provided is a computer-readable medium containing a program code for creating the measurement vector, creating the correlation matrix, creating the autocorrelation matrix, creating the combined matrix, creating the $T^2$ value, stopping semiconductor wafer fabrication, or any combination of two or more of the foregoing, in accordance with the provided method.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure.

Note also that reference is made below to the drawings, which are not drawn to scale for ease of understanding, wherein the same reference numbers used throughout different figures designate the same or similar components. For the sake of clarity, only those elements and reference characters which are of relevance to the shown aspects of the respective embodiment of the present invention are shown repeatedly. In this regard, no attempt is made to show structural details of the invention in more detail than is necessary for a fundamental understanding of the invention, the description taken with the drawings making apparent to those skilled in the art how the several forms of the invention may be embodied in practice.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Statistical Process Control (SPC) may be used throughout semiconductor wafer manufacturing processes to identify when fabrication processes have changed from normal operation, that is, a process and/or tool has begun to go out of control. SPC processes generally take one or more measurements of a wafer, such as wafer thickness or a critical dimension (CD) of a layer, and compare those measurements to statistical or normal averages to identify significant deviations from normal. Many SPC processes set a control limit of three-sigma ($3\sigma$), or three standard deviations, from normal as a limit for detecting significant errors. Measurements that deviate three standard deviations or more from normal are rare enough that such measurements would indicate that a process has changed significantly and may be running out of control. When applied to single wafer samples, SPC processes may produce a "false alarm" rate of about 1% or less. However, in many advanced semiconductor wafer fabrication processes, measurements are not only taken from a single wafer, but multiple wafers may be sampled from a batch of wafers, and multiple parameters may be measured on different wafers. In addition, some parameters may be measured for some wafers within a batch while different parameters are measured for other wafers within the same batch. Without proper correlation between wafers or correlation between parameters, the false alarm rate may increase to 16.5% or more, as the odds of any single parameter measurement falling outside the three-sigma control limit increases as more parameters are measured. As more parameters are added with increased reduction in integrated circuit feature sizes, the false alarm rate may increase even further. Every false alarm potentially shuts down a fabrication tool that is operating within normal parameters and producing usable and acceptable wafers, wasting manufacturing time and wasting technicians' time trying to diagnose a non-existent fault.

Multivariate analysis processes are statistical analysis methods that may correlate multiple parameters to more accurately determine when a significant error in manufacturing has occurred. Multivariate analysis processes, in general, involve constructing a vector of measured parameters and correlating those measurements against a constructed matrix of correlation values between pairs of parameters. The resulting calculation is compared against an expected deviation value based on the number of parameters being measured; if the calculation is less than or equal to this expected deviation value, then the manufacturing process or processes are considered to be operating within acceptable parameters. Thus, even if one or two measurements fall outside the three-sigma control limit, the full vector of measurements may not fall outside the three-sigma control limit, and thus a much lower rate of false alarms may arise.

However, multivariate analyses generally require that all measurements of the vector be available at once; that is, the error analysis cannot be conducted unless all of the parameters to be measured and correlated have actually been measured. If certain values are unavailable to complete the vector, then the analysis cannot proceed. This alone makes multivariate analysis difficult or impossible for SPC processes, as data from sampled wafers generally is not available all at once because no single metrology tool may measure all of the necessary parameters. In addition, sampled wafers may not undergo metrology for a particular processing step for hours or even days after the processing step is finished for those wafers. Thus, while wafers with potentially significant errors are waiting to be measured, more wafers may be produced with the same significant errors, potentially wasting money, materials, and manufacturing time.

Further, multivariate analyses may generally require that the parameters measured be consistent across all sampled wafers, as the correlation matrix generally includes correlations between all possible combinations of parameters. In practice, however, it is not feasible to measure the same parameters consistently across a consistent sample of wafers. Generally, some parameters like thickness may be measured for one sub-set of sampled wafers, other parameters such as a particular critical dimension may be measured for a different sub-set of sample wafers, making the parameters measured inconsistent across wafers. Thus, using ordinary multivariate analysis processes may be inadequate for automatically determining whether a fabrication tool should be shut down. By the time all the variables necessary to complete the measurement vector are available and can be used to determine that a fabrication tool is operating out of control, many dozens or hundreds of additional wafers may have been processed by the same out of control fabrication tool.

Figure 1A:
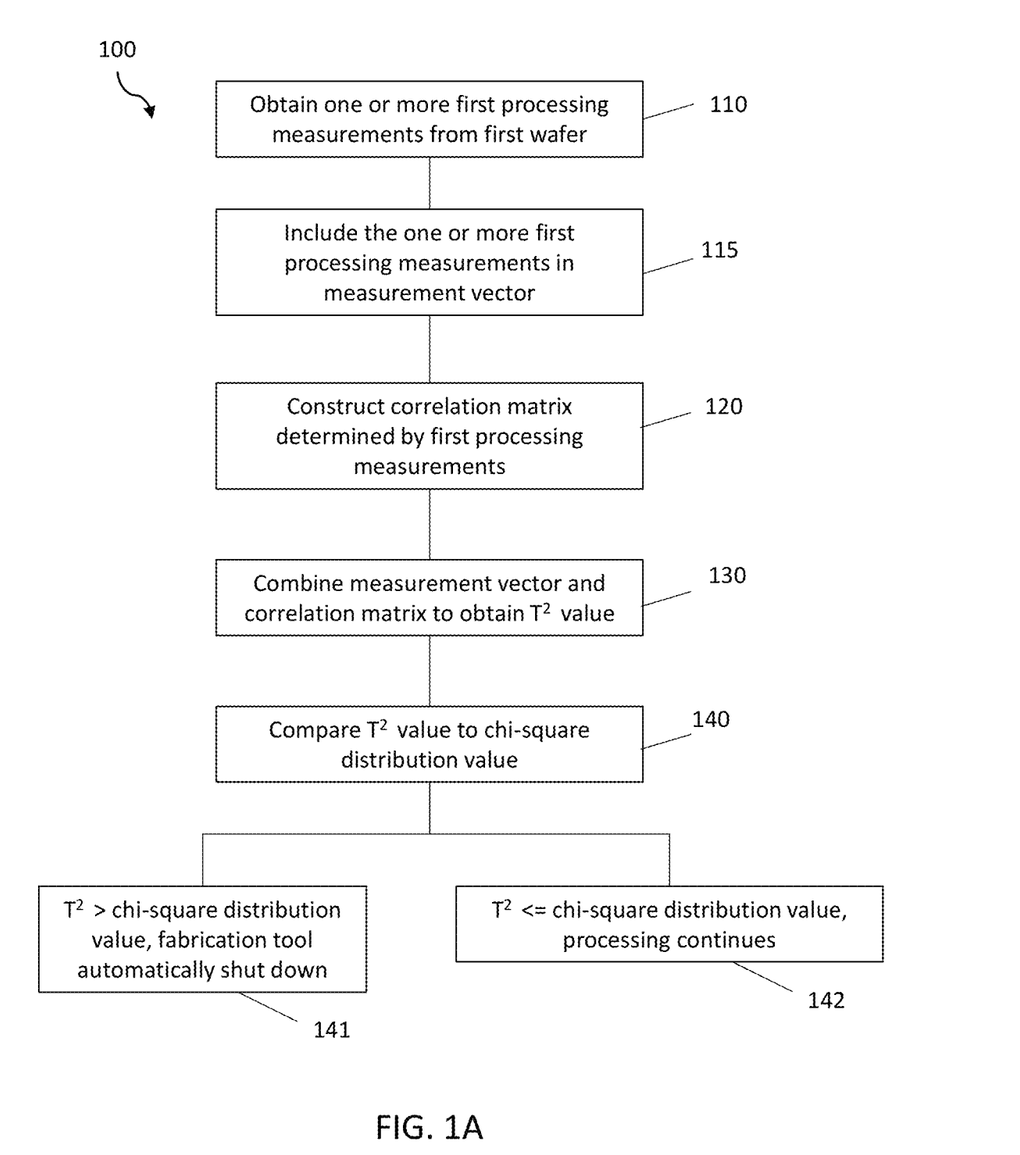
FIG. 1A is a block diagram depicting one embodiment of a process for determining when to shut down a fabrication tool.

FIG. 1A is a block diagram depicting one embodiment of a process 100 for automatically determining when to shut down a fabrication tool. At block 110, one or more first processing measurements are obtained from a first wafer. The first processing measurements, at block 115, are included in a measurement vector. At block 120, a correlation matrix is constructed. The correlation matrix includes correlation values determined by the first processing measurements obtained from the first wafer. At block 130, the measurement vector and correlation matrix are combined to determine a $T^2$ value. The $T^2$ value is compared, at block 140, to a chi-square distribution value, where the chi-square distribution value is determined by the number of first processing measurements made and a pre-selected confidence value. If the $T^2$ value is greater than the chi-square distribution value, then at block 141 a significant processing error is detected, and the fabrication tool is automatically shut down. If the $T^2$ value is less than or equal to the chi-square distribution value, then at block 142 processing continues.

Figure 1B:
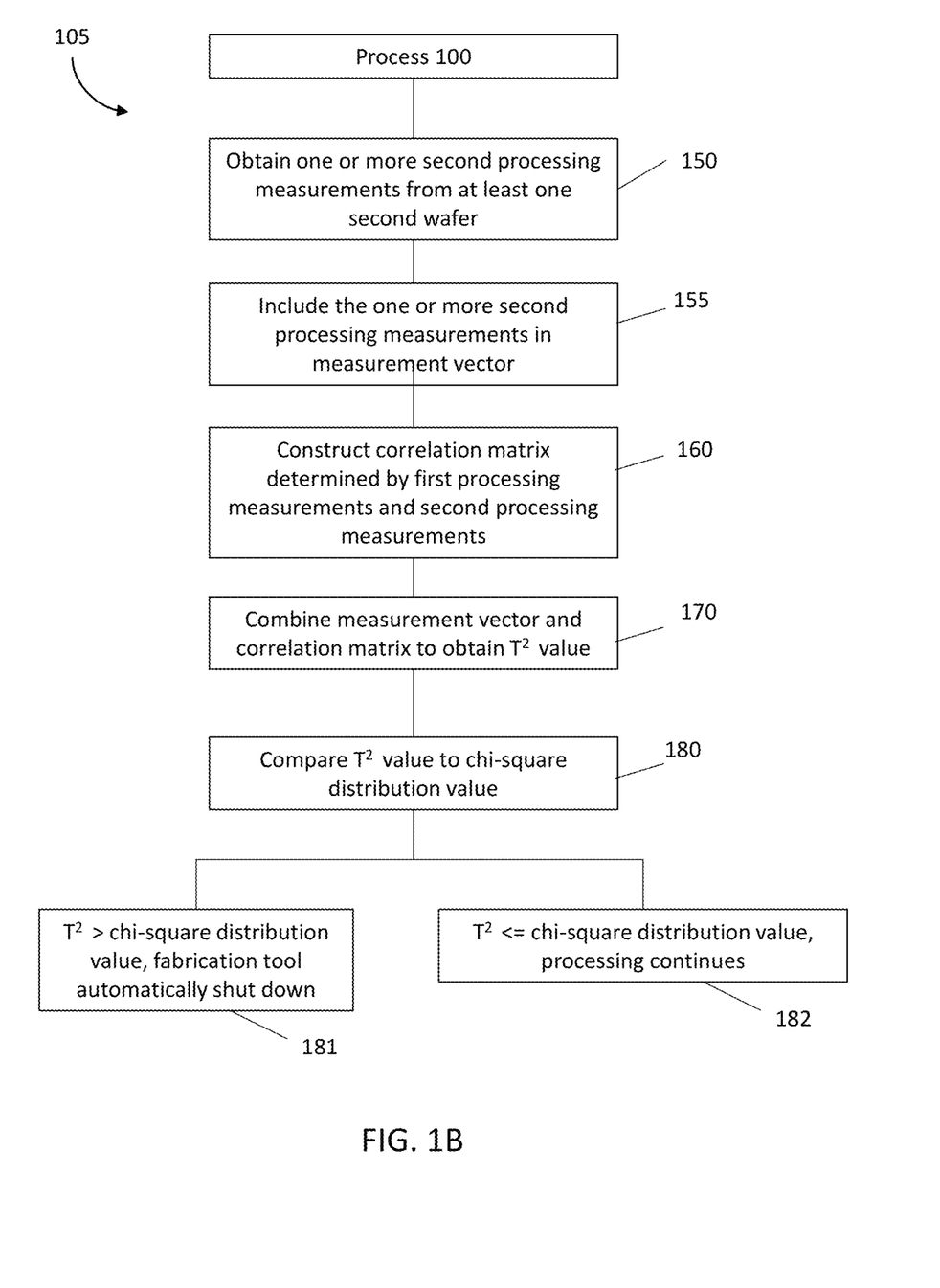
FIG. 1B is a block diagram depicting an additional embodiment of a process for determining when to shut down a fabrication tool.

FIG. 1B is a block diagram depicting at least one embodiment of additional processing 105 following the process 100 of FIG. 1B. At block 150, one or more second processing measurements are obtained from at least one second wafer. The second processing measurements, at block 155, are included in the measurement vector. At block 160, the correlation matrix is updated using the second processing measurements. At block 170, the measurement vector and correlation matrix are combined to determine a $T^2$ value. The $T^2$ value is compared, at block 180, to a chi-square distribution value, where the chi-square distribution value is determined by the number of first processing measurements and second processing measurements made and the pre-selected confidence value. If the $T^2$ value is greater than the chi-square distribution value, then at block 181 a significant processing error is detected, and the fabrication tool is automatically shut down. If the $T^2$ value is less than or equal to the chi-square distribution value, then at block 182 processing continues.

Multivariate analysis processes generally make use of what may be commonly referred to as the $T^2$ value or $T^2$ statistic. The $T^2$ value or statistic is determined by:

$$T^2 = x^T R^{-1} x \tag{1}$$

where x is a vector of measurements and R is a matrix of correlation values between measurements. In application to semiconductor wafer processing, the measurements of the vector x may include thickness, one or more critical dimensions, and/or other wafer parameters that may be measured.

The matrix R generally includes matrix values that represent correlations between different measurements. In general, the more highly related two parameters of a wafer are, the higher the respective correlation value in the matrix R will be for those two parameters. As an example, suppose that the parameters measured for the vector x include a wafer thickness Thk, a first critical dimension CD1, a second critical dimension CD2, and a third critical dimension CD3, so that x expressed in vector form is:

$$x = [Thk, CD1, CD3, CD2]. \tag{2}$$

The corresponding correlation matrix R would contain values that correlate thickness to CD1, thickness to CD2, CD1 to CD2, and so on. The more closely related two parameters are to each other, the higher their correlation value in the matrix R. For example, the thickness of a wafer may not be highly related to a first critical dimension CD1, such as a fin size or gate size; that is, whether the measured critical dimension CD1 falls outside an acceptable range may be unrelated to whether the measured thickness of the wafer Thk falls outside an acceptable range of thickness values. Thus, a correlation value between thickness Thk and critical dimension CD1 may be very low, such as about 0.15. A different critical dimension, such as CD3, may be highly related to the thickness due to the effects of processing a layer where critical dimension CD3 is measured. Thus, a correlation value between thickness Thk and critical dimension CD3 may be relatively high, such as about 0.74. The correlation between a parameter and itself, for the purpose of constructing matrix R, is always 1. Thus, for the example vector x above, the corresponding correlation matrix R might be:

$$R = \begin{bmatrix} Thk & CD1 & CD3 & CD2 \\ 1 & 0.15 & 0.74 & 0.01 \\ 0.15 & 1 & 0.1 & 0.1 \\ 0.74 & 0.03 & 1 & 0.03 \\ 0.01 & 0.1 & 0.03 & 1 \end{bmatrix} \begin{matrix} Thk \\ CD1 \\ CD2 \\ CD3 \end{matrix} \tag{3}$$

The $T^2$ value or statistic is compared to a chi-square distribution value as below:

$$T^2 = x^T R^{-1} x \leq \chi^{-2}(\alpha, n) \tag{4}$$

where α is a pre-set confidence limit and n is the number of measurements. The confidence limit α may itself be determined, in part, by the number of measurements n. If the $T^2$ value is less than or equal to the value of $\chi^{-2}$ then the vector of measurements x may be determined to fall within normal or acceptable parameters, even if any one or more of the individual measurements in x falls outside an acceptable range, such as a value three standard deviations (or more) higher or lower than a normal or average value.

The general multivariate analysis process described above, however, may not account for different parameters measured across different wafers of a batch, nor does it account for common situations in which certain parameter measurements may be unavailable or delayed. To account for these situations, both the measurement vector x and the correlation matrix R may be constructed "on the fly" as data becomes available, as described in FIGS. 1A and 1B above and further below. The processes described below allow for correlating parameters measured within the same wafer separately from correlating parameters between different wafers, and then constructing an overall correlation matrix R, so that the multivariate analysis may be carried out even in the absence of particular measurements and even in situations in which different parameters are measured across different wafers within a wafer batch.

In the processes described above and as exemplified in the example process described below, two correlation matrices $R_1$ and $R_2$ may be constructed to determine an overall correlation matrix R that may be used in equation (1) above. $R_1$ is a correlation matrix for parameters measured on the same wafer, such as thickness of the wafer correlated to a first critical dimension, thickness correlated to a second critical dimension, the first critical dimension correlated to the second critical dimension, and so on. $R_2$ is a correlation matrix for similar parameters measured between wafers, such as the thickness of a first wafer correlated to the thickness of a second wafer, a first critical dimension of the first wafer correlated to the thickness of the second wafer, and so on. In general, different parameters measured on the same wafer will have some value of correlation between 0 and 1, and the same parameter measured on two different wafers will also have some value of correlation between 0 and 1, but it may generally be assumed that the correlation between two different parameters measured on two different wafers is zero (e.g., it may be assumed that there is no correlation between the thickness of one wafer and a measured critical dimension of a second wafer, for example).

The values for correlation matrices $R_1$ and $R_2$ may generally correspond to statistical norms or averages, which may be determined, for example, through empirical measurement and correlation of different parameters for wafers. These statistical norms may be determined both for correlations between parameters on single wafers and for correlations between parameters on different wafers.

Figure 2A:
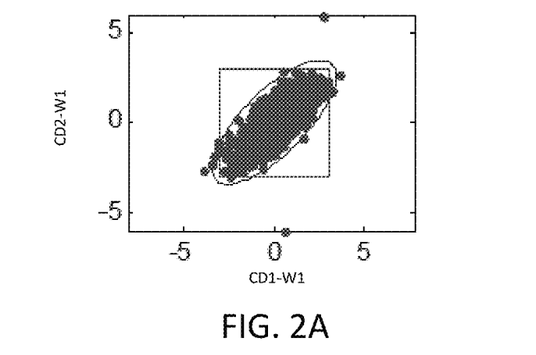
FIG. 2A, FIG. 2B, and FIG. 2C depict a portion of an embodiment for constructing a correlation matrix.
Figure 2B:
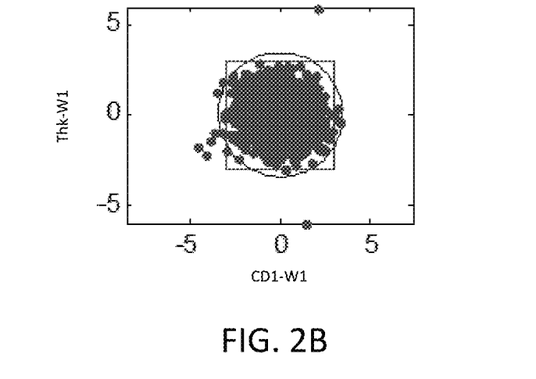
Figure 2C:
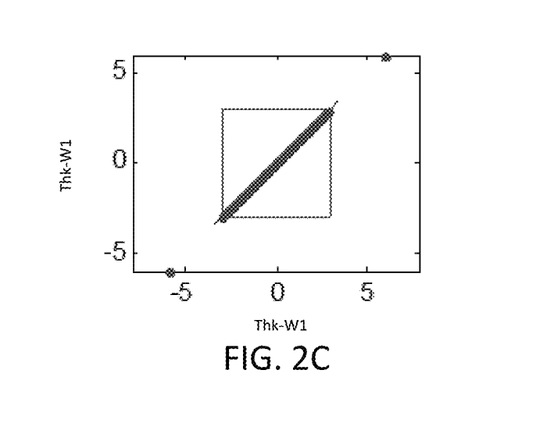

One example method for determining correlation values for matrix $R_1$ is illustrated in part by FIGS. 2A-2C.

FIG. 2A, for example, is a graph depicting correlations between a first critical dimension CD1 and a second critical dimension CD2, as measured on single wafers. Each dot in the graph of FIG. 2A represents a single wafer for which a CD1 measurement (x-axis) and a CD2 measurement (y-axis) has been recorded. As FIG. 2A illustrates, there is a fairly high degree of correlation between CD1 and CD2 as measured on a single wafer; in general, a lower value of one critical dimension corresponds to a lower value of the other critical dimension, and a higher value of one corresponds to a higher value of the other. Few, if any, wafers included in FIG. 2A have a relatively high value of one critical dimension and a correspondingly low value of the other critical dimension. Thus, it may be determined that, on average, there is a correlation value of 0.74 between CD1 and CD2 on a single wafer, indicating a strong or high correlation between the two dimensions.

FIG. 2B, by contrast, is a graph depicting correlations between the first critical dimension CD1 and wafer thickness Thk. As FIG. 2B illustrates, there is very little correlation between the two measured values; some wafers may have high values or low values for both dimensions, while other wafers have a high thickness and low CD1, and so on. The correlation between thickness Thk and CD1 may thus be determined to be only about 0.15 or lower.

Finally, FIG. 2C is a graph of one parameter measured against the same parameter, such that both the x-axis and y-axis represent the same wafer dimension, such as thickness Thk. As one might expect, such a graph should be a straight line with a slope of 1, as a parameter correlates with itself completely. The correlation value for any single parameter is thus 1.

In general, as FIGS. 2A-2C illustrate, the more closely two parameters are correlated, the more closely a graph comparing the two parameters will approach a line having a slope of 1. Conversely, the less closely two parameters are correlated, the less closely the graph will appear to be a line and thus will have a correlation value approaching 0.

Based on available statistical data, as for example the data illustrated in FIGS. 2A-2C as well as additional data, a first correlation matrix $R_1$ can be constructed:

$$R_1 = \begin{bmatrix} R_{P1,P1} & R_{P1,P2} & \cdots & R_{P1,Pn} \\ R_{P2,P1} & R_{P2,P2} & \cdots & R_{P2,Pn} \\ \vdots & \vdots & \ddots & \vdots \\ R_{Pn,P1} & R_{Pn,P2} & \cdots & R_{Pn,Pn} \end{bmatrix} \quad (5)$$

where each $R_{Px,Py}$ represents a correlation value between one measured parameter Px and another measured parameter Py, as described above. The first correlation matrix $R_1$ includes correlation values $R_{Px,Py}$ only for those parameter measurements that are available and that are used to construct the measurement vector x. Thus, if three parameters have been measured on a first wafer, $R_1$ will be a three by three matrix including correlations between each parameter measured; if five parameters are available, $R_1$ will be a five by five matrix. In the simplest scenario in which just one parameter has been measured on a first wafer, $R_1$ will be a single value identity matrix [1], since a parameter correlated to itself will always have a value of 1, as described above.

Figure 3A:
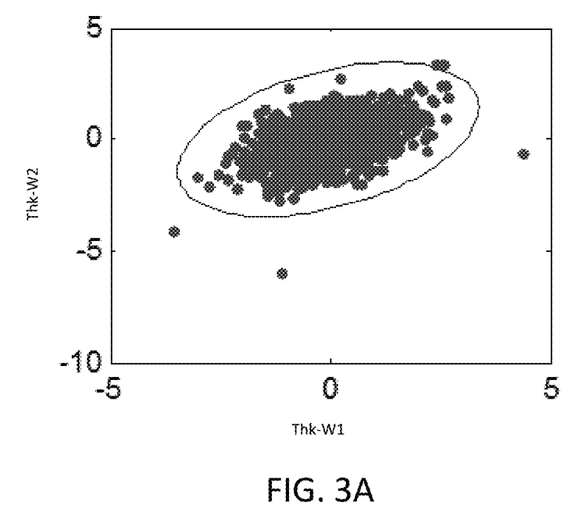
FIG. 3A, FIG. 3B, FIG. 3C, and FIG. 3D depict a portion of another embodiment for constructing a correlation matrix.
Figure 3B:
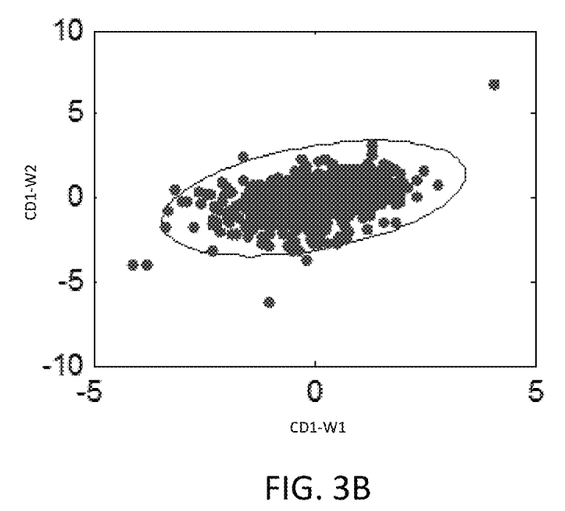
Figure 3C:
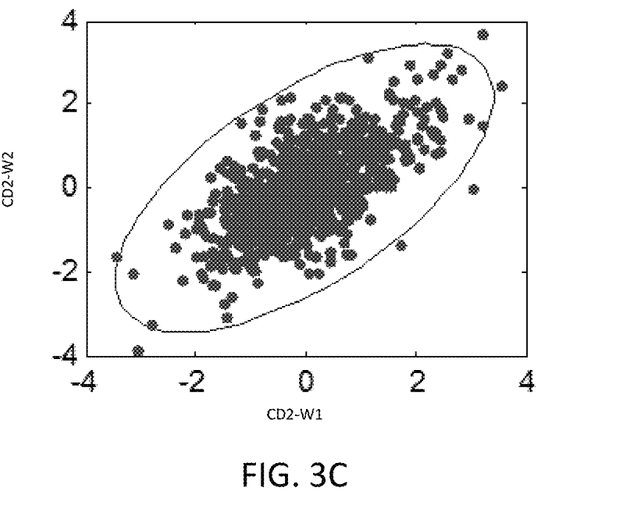
Figure 3D:
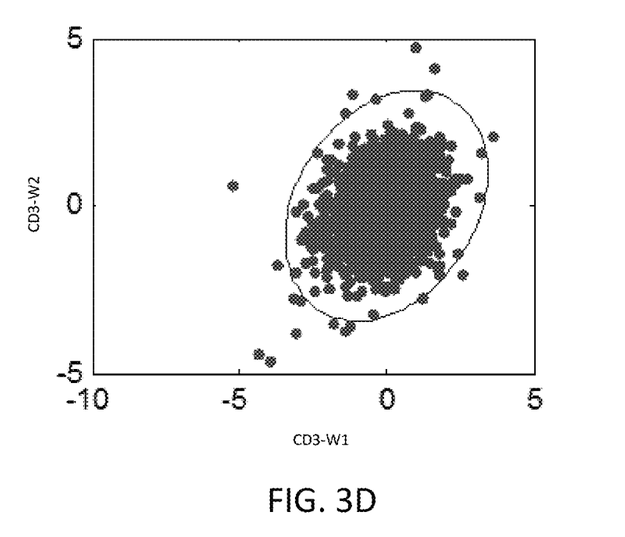

Similarly, an exemplary method for determining correlation values for matrix $R_2$ is illustrated in part by FIGS. 3A-3D. FIG. 3A, for example, is a chart depicting correlations between a thickness Thk-W1 of a first wafer and a thickness Thk-W2 of a second wafer. FIG. 3B is a chart depicting correlations between CD1 for the first wafer W1 and the same CD1 for the second wafer W2, FIG. 3C depicts correlations between CD2 for the first wafer and the same CD2 for the second wafer. FIG. 3D depicts correlations between CD3 for the first wafer and the same CD3 for the second wafer. Each dot in the graphs represents the measurement of the same parameter on the two measured wafers, and a correlation value may be similarly derived for each parameter between wafers as described above for correlations of different parameters taken from a single wafer. Based on the available data measured for parameters of any two wafers of a wafer batch, the second matrix $R_2$ may be constructed:

$$R_2 = \begin{bmatrix} R_{P1W1,P1W2} & 0 & \cdots & 0 \\ 0 & R_{P2W1,P2W2} & \cdots & 0 \\ \vdots & \vdots & \ddots & \vdots \\ 0 & 0 & \cdots & R_{PnW1,PnW2} \end{bmatrix} \quad (6)$$

where each $R_{PxW1,PxW2}$ represents a correlation value between one measured parameter Px on the first wafer (W1) and the same measured parameter Px on the second wafer (W2). Note that other values of the $R_2$ matrix are set at 0, as it may, in one embodiment, be assumed that no significant correlation exists between one parameter measured on the first wafer and a different parameter measured on the second wafer.

It may be noted that, as used above, $R_1$ may refer generally to a correlation matrix for measurements taken from a single wafer, and $R_2$ may refer generally to a correlation matrix for similar parameter measurements taken for any two wafers in a batch; the subscripts 1 and 2 do not refer to the first and second wafers. In practice, an $R_1$ matrix is constructed for each sampled wafer for which any one or more parameters have been measured, and an $R_2$ matrix is constructed for each pair of sampled wafers, within a batch of wafers, for which at least one parameter in common has been measured for both wafers in the pair.

Matrices $R_1$ and $R_2$ for each sampled wafer and pairs of sampled wafers may then be combined into the correlation matrix R. For the case of two wafers for which parameters have been measured, R is:

$$R = \begin{bmatrix} R_{1,w1} & \frac{1}{2}\left( \begin{array}{c} R_{1,w1}R_{2,w1w2} + \\ R_{1,w2}R_{2,w1w2} \end{array} \right) \\ \frac{1}{2}(R_{1,w2}R_{2,w1w2} + R_{1,w1}R_{2,w1w2}) & R_{1,w2} \end{bmatrix} \quad (7)$$

As those with skill in the art will recognize, the matrix R may be expanded to accommodate three or more sampled wafers, with a corresponding number of $R_1$ matrices and pairings of $R_1$ and $R_2$ matrices between pairs of wafers. Those with skill in the art will also recognize that for any number n measurements obtained across one or more sampled wafers of a batch, the resulting correlation matrix R will be a n×n matrix of correlation values, where each value in the correlation matrix R represents either a) the correlation value between two parameters measured on a single wafer, or b) the correlation value between a parameter measured on one wafer and the same parameter measured on another wafer. This construction of the correlation matrix R, as described above, allows for R to be recalculated at any time whenever one or more additional parameter measurements are available from a wafer, regardless of whether the additional one or more parameters are taken from a wafer already measured or from a different wafer.

The example below illustrates the methods described in part above. One or more first process measurements are obtained from a first wafer, generally one wafer selected for measurement from a batch of wafers. For the purposes of the example described here, one measurement obtained from the first wafer may be a first wafer thickness Thk1. For instance, the thickness Thk1 may have a measured value of 0.344. The corresponding first correlation matrix R is [1], as:

$$R_{1,w1} = [R_{Thk1,Thk1}] = [1] \quad (8)$$

and $R_2$ is 0, as no parameters are yet measured on any other wafers. The $T^2$ value is then:

$$T^2 = [0.344][1]^{-1}[0.344] = 0.118 \quad (9)$$

A typical confidence value a for a three-sigma distribution may be 0.9973, thus the chi-square distribution value may be calculated as:

$$\chi^{-2}(0.9973,1) = 9.00 \quad (10)$$

As the $T^2$ value is less than the value of $\chi^{-2}$ it may be concluded that the thickness of the first wafer falls within an acceptable thickness range, and the fabrication tool is operating within acceptable limits (and thus is not operating out of control). Thus, the fabrication tool may be allowed to continue processing other wafers.

One or more additional first process measurements may be obtained as additional metrology processes are applied to the first wafer. For example, after undergoing metrology processes for measuring wafer thickness, the first wafer may undergo additional metrology processes to determine other dimensions, such as a first critical dimension and a second critical dimension. The additional first process measurements, for instance CD1=−1.504 and CD2=−1.456, are included in the measurement vector x:

$$x = [0.344 - 1.504 - 1.456] \quad (11)$$

The corresponding correlation matrix R will again correspond the correlation matrix $R_1$ for the first wafer, as no parameters from other wafers have yet been measured. $R_1$ and thus R may then be constructed based on the available measurements Thk, CD1, and CD2:

$$R = \begin{bmatrix} Thk & CD1 & CD2 \\ 1 & 0.01 & 0.03 \\ 0.01 & 1 & 0.74 \\ 0.03 & 0.74 & 1 \end{bmatrix} \begin{matrix} Thk \\ CD1 \\ CD2 \end{matrix} \quad (12)$$

Then, $$T^2 = [0.344 \ -1.504 \ -1.456] \begin{bmatrix} 1 & 0.01 & 0.03 \\ 0.01 & 1 & 0.74 \\ 0.03 & 0.74 & 1 \end{bmatrix}^{-1} \begin{bmatrix} 0.344 \\ -1.504 \\ -1.456 \end{bmatrix} \quad (13)$$

$$= 2.66$$

The corresponding $\chi^{-2}$ value is:

$$\chi^{-2}(0.9973,3) = 14.2 \quad (14)$$

Again, because $T^2$ is less than the $\chi^{-2}$ value, it may be concluded that the fabrication tool that produced the first wafer (e.g., the sample wafer undergoing measurement) is producing acceptable wafers, and therefore not operating out of control. This may be true even if any one of the measurements Thk1, CD1, or CD2 falls outside of the three-sigma control limit.

One or more second process measurements may be obtained as metrology processes are applied to a second wafer. For example, a thickness Thk2 may be obtained for a second wafer. An $R_1$ matrix for the second wafer W2 would be $R_1$=[1]. The $R_2$ matrix may be constructed based on a correlation value for thickness measurements between wafers. For example, if the correlation value for a thickness parameter is about 0.41, then the $R_2$ matrix is $R_2$=[0.41]. The overall correlation matrix is given by equation 7:

$$R = \begin{bmatrix} R_{1,w1} & \frac{1}{2}\left( \begin{array}{c} R_{1,w1}R_{2,w1w2} + \\ R_{1,w2}R_{2,w1w2} \end{array} \right) \\ \frac{1}{2}(R_{1,w2}R_{2,w1w2} + R_{1,w1}R_{2,w1w2}) & R_{1,w2} \end{bmatrix} \quad (7)$$

which, using the example correlation values above, may result in R:

$$R = \begin{bmatrix} 1 & 0.01 & 0.03 & 0.29 \\ 0.01 & 1 & 0.74 & -0.01 \\ 0.03 & 0.74 & 1 & 0.03 \\ 0.29 & -0.01 & 0.03 & 1 \end{bmatrix} \quad (15)$$

As the example above illustrates, the correlation matrix R may be expanded to include and accommodate parameter measurements as they are obtained, and the $T^2$ value calculated at any stage of metrology to determine whether a fabrication tool is out of control and should be shut down, or whether the fabrication tool is still operating within normal parameters and producing acceptable wafers.

Furthering the example above, the calculation of $T^2$ below assumes that measurements for thickness, CD1, CD2, and CD3 have been obtained for a first wafer and a second wafer of a batch of wafers. The measurement vector x in this example may be, for instance, $$x=[0.344\ -1.504\ -1.456\ -2.303\ 1.077\ -0.494\ -0.838\ -3.04] \quad (16)$$

corresponding to Thk1=0.344, Thk2=1.077, and so on. The corresponding correlation matrix R may then be:

$$R = \begin{bmatrix} 1 & 0.00 & 0.01 & 0.04 & 0.29 & 0.00 & 0.01 & 0.04 \\ 0.00 & 1 & 0.74 & 0.15 & -0.01 & 0.42 & 0.39 & 0.06 \\ 0.01 & 0.74 & 1 & 0.03 & 0.03 & 0.39 & 0.64 & 0.02 \\ 0.04 & 0.15 & 0.03 & 1 & 0.10 & 0.06 & 0.02 & 0.41 \\ 0.29 & -0.01 & 0.03 & 0.10 & 1 & 0.00 & 0.01 & 0.04 \\ 0.00 & 0.42 & 0.39 & 0.06 & 0.00 & 1 & 0.74 & 0.15 \\ 0.01 & 0.39 & 0.64 & 0.02 & 0.01 & 0.74 & 1 & 0.03 \\ 0.04 & 0.06 & 0.02 & 0.41 & 0.04 & 0.15 & 0.03 & 1 \end{bmatrix} \quad (17)$$

The resulting $T^2$ value, based on equations 16 and 17, is 14.8. The corresponding $\chi^{-2}$ value is:

$$\chi^{-2}(0.9973,8)=23.6 \quad (18)$$

Again, as $T^2$ is less than the $\chi^{-2}$ value, it may be concluded that the fabrication tools in question are still operating within normal parameters.

Figure 4:
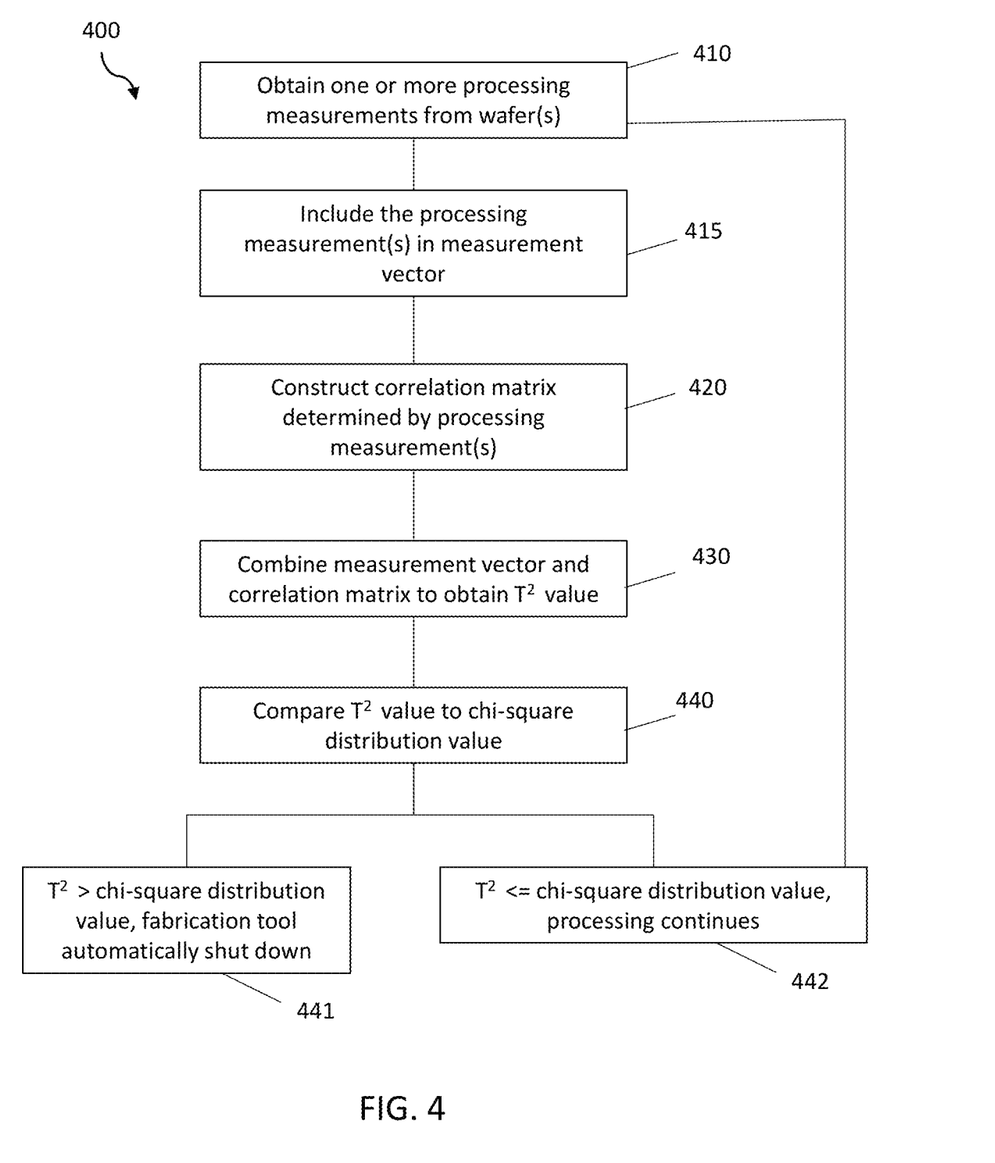
FIG. 4 depicts a method for obtaining a $T^2$ value.

FIG. 4 is a block diagram depicting one embodiment of a process 400 for automatically determining when to shut down a fabrication tool. At block 410, one or more processing measurements are obtained from a wafer or wafers. This could include measurements from a first wafer from which measurements are available, or one or more processing measurements from multiple wafers, as measurements are iteratively obtained through a semiconductor fabrication process or processes. The processing measurements, at block 415, are included in a measurement vector. At block 420, a correlation matrix is constructed. The correlation matrix includes correlation values determined by the processing measurements obtained from the wafer or wafers as indicated at block 410. At block 430, the measurement vector and correlation matrix are combined to determine a $T^2$ value. The $T^2$ value is compared, at block 440, to a chi-square distribution value, where the chi-square distribution value is determined by the number of processing measurements made at block 410 and included in a measurement vector at block 415 (providing a degrees of freedom value for a chi-square distribution value) and a preselected confidence value. In other embodiments, a different preselected confidence value may be used, other than as determined by a chi-square distribution value (not shown) at block 440, to determine whether a $T^2$ value represents operation of a fabrication tool that is performing out of control. If the $T^2$ value is greater than the chi-square distribution (or other critical) value, then at block 441 a significant processing error is detected, and the fabrication tool is automatically shut down. If the $T^2$ value is less than or equal to the chi-square distribution (or other critical) value, then at block 442 processing continues.

As additional measurements become available from the same wafers from which measurements had already been obtained or from additional wafers, the process 400 is repeated, returning again to block 410 for obtention of available measurements (including those previously obtained and newly available measurements), creating a new measurement vector by including all available processing measurements therein at block 415, etc. In this way, evaluation of fabrication tool performance and detection of out of control processing may continue through a processing step or steps, to be continuously updated as often as new measurements become available.

Repeatedly updating a $T^2$ value and repeatedly comparing it to a chi-square distribution (or other critical) value significantly improves the technological field of semiconductor chip manufacturing in various ways. For example, false alarm rates where out of control fabrication processing is erroneously identified may be significantly reduced compared to conventional methodology for determining stoppage of fabrication tool functioning, reducing the time lost to such erroneous stoppages. According to a method as disclosed herein, out of control functioning of semiconductor fabrication tools may be ascertained with a higher degree of reliability than is conventionally possible, using measurements of various fabrication processing parameters as they become available, and on wafers as they become available, without the need for a given measurement to have been obtained for all wafers for an assessment of out of control function to be performed.

Furthermore, in some non-limiting examples, creating, constructing, or obtaining measurement vectors, correlation matrixes, autocorrelation matrixes, combined matrixes, $T^2$ values, or any combinations thereof by a computer may provide essential temporal benefits without which the process may be of minimized value. For example, timeliness of assessing out of control processing may be important in some cases in order to assess processing in a way to meaningfully affect tool functioning or malfunctioning. In some such instances, a combined volume of wafers and structural or other parameters thereof may be processed and/or measured at a rate at which it would be difficult or impossible to assess out of control processing in a sufficiently timely manner to stop fabrication tool processing and prevent substantial out of control processing without the use of a computer. In such non-limiting examples, creating, constructing, or obtaining measurement vectors, correlation matrixes, autocorrelation matrixes, combined matrixes, $T^2$ values, or any combinations thereof by a computer may permit assessment of fabrication tool performance in real time, with continual evaluation of out of control performance using new measurements as they are obtained, even if such a volume of process parameters, being different measures and/or from a large and growing volume of processed wafers, were being obtained that determining $T^2$ values in a meaningfully usable time frame would be difficult or not possible.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may include a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to include a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 5:
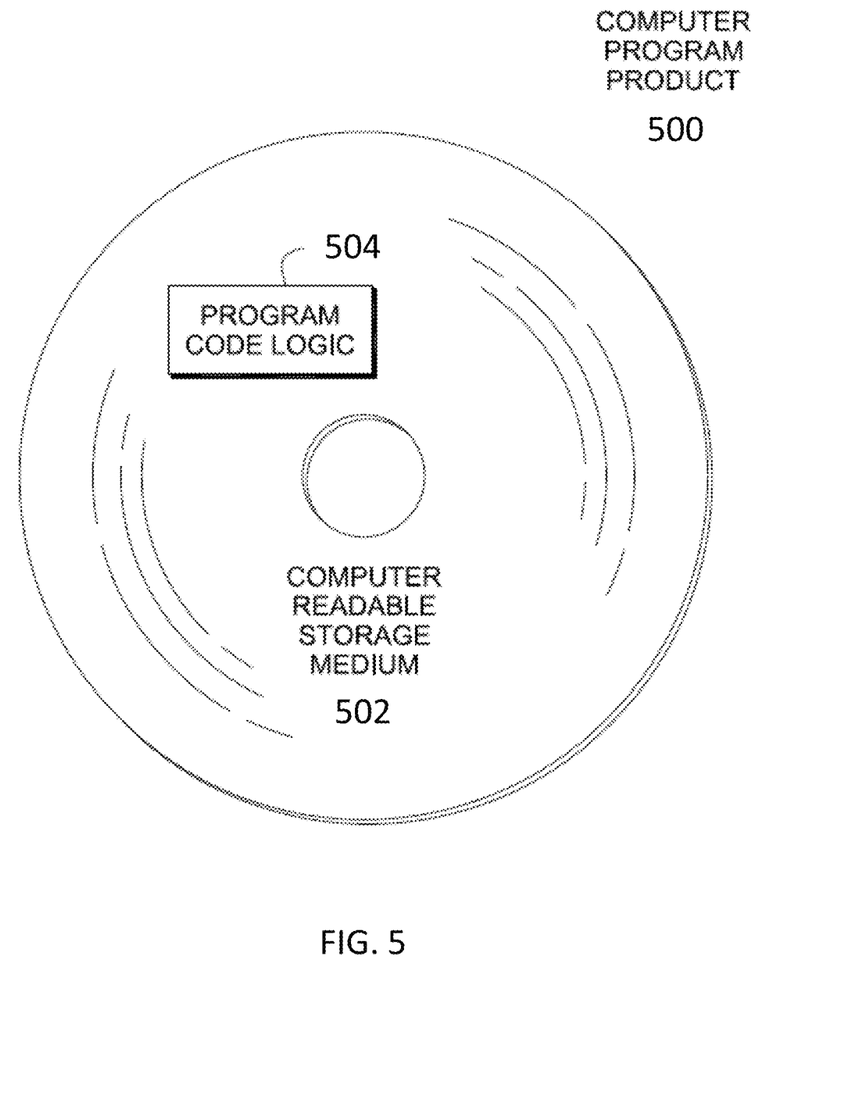
FIG. 5 illustrates an embodiment of a computer program product, in accordance with one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which includes one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

In some embodiments, a data processing system (computer, computer system, etc. including a component thereof) employing code to perform the processes disclosed herein may be coupled to one or more measurement devices, also known as metrology devices, such as a four-point wafer probe, a reflectometer, a stress gauge, an ellipsometer, a surface profiler, and/or other measurement devices. The data processing system may receive measurements of one or more physical parameters, of one or more sampled wafers, from the one or more measurement devices to perform data or statistical analysis processes as described herein, in accordance with one or more aspects of the invention. The data processing system may also be coupled to one or more fabrication tools so that the data processing system may control and shut down the fabrication tools when it is determined, according to the processes described herein, that a process has failed or is out of control. Such fabrication tools may include, but are not limited to, lithographic etching tools, wet etching tools, chemical-mechanical polishing tools, chemical or physical vapor deposition tools, and so on.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method for stopping semiconductor fabrication, comprising:
   creating a measurement vector comprising a measurement of each of one or more parameters from each of one or more semiconductor wafers;
   for each of the one or more semiconductor wafers, creating a correlation matrix, wherein the correlation matrix comprises correlations between measurements of parameters obtained of each said wafer;
   for each pair of the one or more semiconductors for which a measurement of a parameter has been obtained from each semiconductor wafer of the pair, creating an autocorrelation matrix, wherein the autocorrelation matrix comprises correlations between measurements of the parameter obtained of each wafer of the pair;
   creating a combined matrix, wherein creating comprises combining correlation and autocorrelation matrixes into a combined matrix;
   obtaining a $T^2$ value from the measurement vector and combined matrix; and
   stopping a semiconductor wafer fabrication tool if the $T^2$ value exceeds a critical value.

2. The method of claim 1, wherein the critical value is a chi-square distribution value comprising a degrees of freedom value and a preselected confidence value and the degrees of freedom value comprises the number of measurements in the measurement vector.

3. The method of claim 2, wherein the confidence value is greater than 95%.

4. The method of claim 2, wherein the confidence value is greater than 97.5%.

5. The method of claim 4 wherein the confidence value is greater than 99%.

6. The method of claim 1, wherein the measurement vector, the correlation matrix, the autocorrelation matrix, the combined matrix, the $T^2$ value, or any combination of two or more of the foregoing, is created, constructed, or obtained by a computer.

7. The method of claim 1, wherein a computer stops the semiconductor wafer fabrication tool if a $T^2$ value is obtained that exceeds a critical value.

8. The method of claim 1, wherein the critical value is a chi-square distribution value and the chi-square distribution value is determined by how many measurements are in the measurement vector and a pre-selected confidence value and the confidence value is greater than 95%.

9. The method of claim 1, wherein the critical value is a chi-square distribution value and the chi-square distribution value is determined by how many measurements are in the measurement vector and a pre-selected confidence value and the confidence value is greater than 99%.

10. The method of claim 1, wherein the measurement vector, the correlation matrix, the autocorrelation matrix, the combined matrix, the $T^2$ value, or any combination of two or more of the foregoing, is created, constructed, or obtained by a computer. and the computer stops the semiconductor wafer fabrication tool if the $T^2$ value exceeds the critical value.

11. A method for stopping semiconductor fabrication, comprising:
    creating a measurement vector comprising a measurement of each of one or more parameters from each of one or more semiconductor wafers;
    for each of the one or more semiconductor wafers, creating a correlation matrix, wherein the correlation matrix comprises correlations between measurements of parameters obtained of each said wafer;
    for each pair of the one or more semiconductors for which a measurement of a parameter has been obtained from each semiconductor wafer of the pair, creating an autocorrelation matrix, wherein the autocorrelation matrix comprises correlations between measurements of the parameter obtained of each wafer of the pair;
    creating a combined matrix, wherein creating comprises combining correlation and autocorrelation matrixes into a combined matrix;
    obtaining a $T^2$ value from the measurement vector and combined matrix;
    wherein the measurement vector, the correlation matrix, the autocorrelation matrix, the combined matrix, the $T^2$ value, or any combination of two or more of the foregoing, is created, constructed, or obtained by a computer; and
    stopping a semiconductor wafer fabrication tool if the $T^2$ value exceeds a chi-square distribution value comprising a degrees of freedom value and a preselected confidence value and the degrees of freedom value comprises the number of measurements in the measurement vector and the preselected confidence value is greater than 95%.

12. The method of claim 11 wherein the preselected confidence value is greater than 97.5%.

13. The method of claim 12 wherein the preselected confidence value is greater than 99%.

14. The method of claim 11, wherein a computer stops the semiconductor wafer fabrication tool if the $T^2$ value exceeds the critical value.

15. The method of claim 12, wherein a computer stops the semiconductor wafer fabrication tool if the $T^2$ value exceeds the critical value.

16. The method of claim 13, wherein a computer stops the semiconductor wafer fabrication tool if the $T^2$ value exceeds the critical value.

17. A method for stopping semiconductor fabrication, comprising:
    creating a measurement vector comprising a measurement of each of one or more parameters from each of one or more semiconductor wafers;
    for each of the one or more semiconductor wafers, creating a correlation matrix, wherein the correlation matrix comprises correlations between measurements of parameters obtained of each said wafer;
    for each pair of the one or more semiconductors for which a measurement of a parameter has been obtained from each semiconductor wafer of the pair, creating an autocorrelation matrix, wherein the autocorrelation matrix comprises correlations between measurements of the parameter obtained of each wafer of the pair;
    creating a combined matrix, wherein creating comprises combining correlation and autocorrelation matrixes into a combined matrix;
    obtaining a $T^2$ value from the measurement vector and combined matrix;
    wherein the measurement vector, the correlation matrix, the autocorrelation matrix, the combined matrix, the $T^2$ value, or any combination of two or more of the foregoing, is created, constructed, or obtained by a computer; and stopping a semiconductor wafer fabrication tool if the $T^2$ value exceeds a chi-square distribution value comprising a degrees of freedom value and a preselected confidence value and the degrees of freedom value comprises the number of measurements in the measurement vector and the preselected confidence value is greater than 95%, wherein a computer stops the semiconductor wafer fabrication tool.

18. The method of claim 17 wherein the preselected confidence value is greater than 97.5%.

19. The method of claim 18 wherein the preselected confidence value is greater than 99%.

20. A computer readable medium containing a program code for creating the measurement vector, creating the correlation matrix, creating the autocorrelation matrix, creating the combined matrix, creating the $T^2$ value, stopping semiconductor wafer fabrication, or any combination of two or more of the foregoing, in accordance with the method of claim 19.

\* \* \* \* \*